(12) United States Patent
Rockwood et al.

(10) Patent No.: US 6,415,644 B1
(45) Date of Patent: Jul. 9, 2002

(54) ULTRASONIC CALIBRATION APPARATUS

(75) Inventors: Terry Scott Rockwood, Lakeland, FL (US); Ricky A. Seals, Hillsboro, TN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/303,025

(22) Filed: Apr. 30, 1999

Related U.S. Application Data

(60) Provisional application No. 60/131,548, filed on Apr. 29, 1999.

(51) Int. Cl.[7] .............................................. G01D 18/00
(52) U.S. Cl. ...................................................... 73/1.86
(58) Field of Search ................................ 73/1.79, 1.81, 73/1.86; 367/13

(56) References Cited

U.S. PATENT DOCUMENTS

| | | |
|---|---|---|
| 4,962,591 A | 10/1990 | Zeller et al. |
| 5,163,027 A | 11/1992 | Miller et al. |
| 5,501,096 A | 3/1996 | Stettner et al. |
| 5,665,893 A | 9/1997 | Smith |
| 5,804,730 A | 9/1998 | Pfannenstiel et al. |
| 5,837,880 A * | 11/1998 | Shakinovsky et al. ....... 73/1.86 |

* cited by examiner

Primary Examiner—Robert Raevis
(74) Attorney, Agent, or Firm—Armstrong Teasdale LLP

(57) ABSTRACT

A universal calibration apparatus for use with an ultrasonic transducer is described. The calibration apparatus is fabricated from an elongate block of metal. The calibration apparatus includes a first portion having a first curved section, located at a first end of the apparatus, and a second curved section adjacent the first curved section. The first curved section having a thickness less than the thickness of the second curved section. The calibration apparatus also includes a second portion, located adjacent to the first portion, that includes a flat elongate section having a plurality of calibration holes extending therethrough and a plurality of scribe lines located on a first surface. The calibration apparatus further includes a third portion, located at a second end, that includes a plurality of step sections and a plurality of notches. The notches extend from a first edge to a second edge of the apparatus. Each step section has a different thickness from the other step sections.

24 Claims, 1 Drawing Sheet

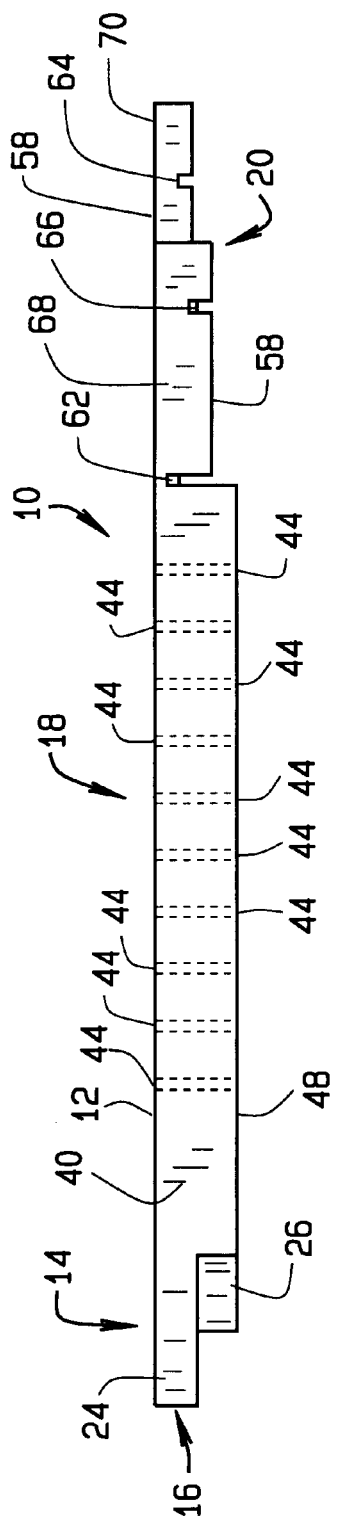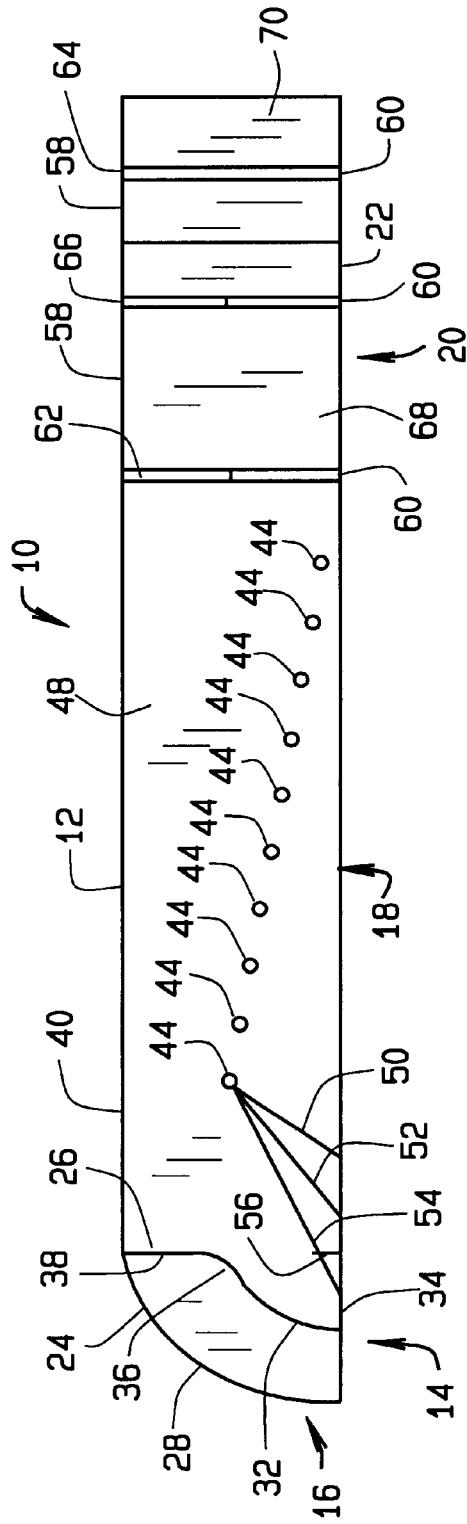

ULTRASONIC CALIBRATION APPARATUS

CROSS REFERENCE TO RELATED APPLICATIONS

This application claims the benefit of U.S. Provisional Application No. 60/131,548 filed Apr. 29, 1999.

BACKGROUND OF THE INVENTION

This invention relates generally to calibration blocks and more particularly, to a universal calibration block for ultrasonic transducers.

Ultrasonic probes are used to inspect many different types of structures. For example, ultrasonic probes may be used to examine piping for wall thickness, weld integrity, and cracking. Ultrasonic probes are used extensively in the nuclear energy industry to examine the various components of a nuclear reactor for stress corrosion cracking. Ultrasonic probes are also used for inspections in the petroleum industry and the aerospace industry, typically for metal cracking, weld integrity, and metal thickness.

To function properly and to provide accurate readings, ultrasonic probes require calibration before use. Usually several different calibrations are performed on an ultrasonic probe utilizing a number of different calibration blocks. For example the following calibrations are typically performed before an ultrasonic probe may be accurately used, determination and verification of beam angle, sweep range calibration, sensitivity calibration including zero degree longitudinal wave sensitivity, shear wave sensitivity, and refracted longitudinal wave sensitivity, ultrasonic flaw detection including horizontal linearity, screen height linearity, and amplitude control linearity, and digital thickness determination. Each calibration generally requires a separate calibration block, or calibration standard. In addition it is often desirous to fabricate the calibration blocks from the same material that the component to be. examined is fabricated from, for example, aluminum, carbon steel, stainless steel, inconel, etc.

A disadvantage to this practice of using different calibration blocks for the various calibrations needed for ultrasonic probes is the need for multiple standard blocks. Another disadvantage is the need to have multiples of each different calibration standard block fabricated from the various materials that are to be examined.

It would be desirable to provide a calibration technique that does not require different calibration blocks for the various calibrations that need to be performed on ultrasonic probes.

BRIEF SUMMARY OF THE INVENTION

These and other objects may be attained by a universal calibration block for calibrating ultrasonic transducer probes. The universal calibration block may be used for all ultrasonic transducer probe calibrations normally performed. The calibration block is typically fabricated from an elongate block of metal. The calibration block includes a first portion located at a first end of the elongate block, a second portion located adjacent the first portion, and a third portion located at a second end of the elongate block and adjacent the second portion.

The first portion includes a first curved section, located at a first end of the elongate block, and a second curved section stepped back from the first curved section. The first curved section has a thickness less than the thickness of the second curved section. The first curved section of the first portion includes a convex curved end surface. The second curved section of the first portion includes a first surface having a convex radius, a second surface adjacent the first surface, having a concave radius, and a substantially straight third surface extending to the second edge of the calibration block. The third part is configured to intersect the second edge of the calibration block at a right angle.

The second portion includes a flat elongate section having a plurality of calibration holes extending therethrough and a plurality of scribe lines located on a first surface of the flat elongate section. The plurality of calibration holes are equally spaced apart from each other in a longitudinal direction and offset from the first edge of the elongate block in equal increasing increments. The first surface of the second portion includes first, second and third scribed lines extending from the calibration hole offset farthest from the first edge of the block to the first edge of the calibration block. The first scribed line extends at an angle of about 45 degrees from a plane intersecting the hole and perpendicular a longitudinal axis of the calibration block. The second line extends at an angle of about 60 degrees from the perpendicular plane, and the third line extends at an angle of about 70 degrees from the perpendicular plane. The first surface of the second portion also includes a fourth scribed line which extends perpendicular from the first edge of the calibration block such that the fourth line intersects the first edge at an apex of the radius of the first surface of the second curved section of the first portion of the calibration block.

The third portion includes a plurality of steps and a plurality of notches. The notches extend from a first edge to a second edge of the calibration block. Typically, the calibration block includes at least three notches. The depth of a first notch is equal to about 80 percent of the thickness of the calibration block measured at the location of the first notch. The depth of a second notch is equal to about 50 percent of the thickness of the block measured at the location of the second notch. The depth of a third notch is equal to about 20 percent of the thickness of the block measured at the location of the third notch. The third portion typically includes at least two steps. A first step having a thickness less than the thickness of the second portion of the elongate block, and a second step having a thickness less than the thickness of the first step. If the calibration block includes additional steps, each succeeding step has a thickness less than the thickness of the preceding adjacent step.

In operation, an ultrasonic transducer probe is placed on the universal calibration block and the following calibration may be performed: flaw depth sizing, linear time base in both depth and metal path, transducer angle verification, transducer index point verification, longitudinal wave resolution and time base verification, and material ultrasonic velocity/delay verification. Each of the above calibrations are performed according to the ultrasonic transducer probe manufacturer's recommended instructions. However, the above described universal calibration block is substituted for the calibration block recommended by the manufacturer of the ultrasonic transducer probe.

The above described universal calibration block permits the calibration of an ultrasonic transducer probe without requiring different calibration standard blocks for the various calibrations that need to be performed on ultrasonic probes.

BRIEF DESCRIPTION OF THE DRAWINGS

FIG. 1 is a side view of a universal calibration apparatus in accordance with an embodiment of the present invention.

FIG. 2 is an edge view of the universal calibration apparatus shown in FIG. 1.

DETAILED DESCRIPTION OF THE INVENTION

FIG. 1 is a side view of a universal calibration apparatus 10 in accordance with an embodiment of the present invention and FIG. 2 is an edge view of universal calibration apparatus 10. Referring to FIGS. 1 and 2, universal calibration apparatus 10 may be used for all ultrasonic transducer probe (not shown) calibrations normally performed. Calibration apparatus 10 includes an elongate block of metal 12. Block 12 includes a first portion 14 located at a first end 16 of elongate block 12, a second portion 18 located adjacent first portion 14, and a third portion 20 located at a second end 22 of elongate block 12 and adjacent second portion 18.

First portion 14 includes a first curved section 24, located at first end 16 of elongate block 12, and a second curved section 26 adjacent first curved section 24. First curved section 24 has a thickness less than the thickness of second curved section 26. First curved section 24 of first portion 14 includes a convex curved end surface 28. Second curved section 26 of first portion 14 includes a first surface 32 having a convex radius extending from a first edge 34 of elongate block 12, a second surface 36 adjacent first surface 32, having a concave radius, and a substantially straight third surface 38 extending to a second edge 40 of elongate block 12. Third surface 38 is configured to intersect second edge 40 of elongate block 12 at a right angle.

Second portion 18 includes a flat elongate section 42 having a plurality of calibration holes 44 extending therethrough and a plurality of scribe lines 46 located on a first surface 48 of elongate 12. Calibration holes 44 are equally spaced apart from each other in a longitudinal direction and offset from first edge 34 of elongate block 12 in equal increasing increments. Calibration hole 44 offset the farthest from first edge 34 is located closest to first end 16 of block 12. In one embodiment, first surface 48 includes first, second, and third scribed lines 50, 52, and 54 extending to first edge 34 of elongate block 12 from calibration hole 42 offset farthest from first edge 34 of block 12. First scribed line 50 extends at an angle of about 45 degrees from a plane intersecting calibration hole 44 and perpendicular to a longitudinal axis of elongate block 12. Second line 52 extends at an angle of about 60 degrees from the perpendicular plane, and third line 54 extends at an angle of about 70 degrees from the perpendicular plane. First surface 48 of second portion18 also includes a fourth scribed line 56 which extends perpendicular from first edge 34 of elongate block 12 such that fourth line 54 intersects first edge 34 at an apex of the radius of first surface 32 of second curved section 26 of first portion 14.

Third portion 20 includes a plurality of step sections 58 and a plurality of notches 60. Notches 60 extend from first edge 34 to second edge 40 of elongate block 12. Typically, elongate block 12 includes at least three notches 60. In one embodiment, the depth of a first notch 62 is equal to about 80 percent of the thickness of elongate block 12 measured at the location of first notch 62. The depth of a second notch 64 is equal to about 50 percent of the thickness of block 12 measured at the location of second notch 64. The depth of a third notch 66 is equal to about 20 percent of the thickness of block 12 measured at the location of third notch 66.

The third portion 20 typically includes at least two step sections 58. In one embodiment, a first step section 68 having a thickness less than the thickness second portion 18 of elongate block 12, and a second step section 70 having a thickness less than the thickness of first step section 68. Calibration block 12 may include additional step sections 58. Each succeeding step section 58 has a thickness less than the thickness of the preceding adjacent step section 58.

Calibration apparatus 10 may be fabricated from any suitable material, for example, aluminum, carbon steel, stainless steel, INCONEL® (nickel-chromium alloy steel), copper, brass, and the like. Preferably, calibration apparatus 10 is fabricated from the same material that is to be examined by the ultrasonic transducer probe. Calibration apparatus 10 may be any suitable length and width. In one embodiment, calibration apparatus is about 18.0 inches long, 2.0, and about 1.5 inches thick.

In operation, an ultrasonic transducer probe (not shown) is placed on universal calibration apparatus 10 and the following calibration may be performed: flaw depth sizing, linear time base in both depth and metal path, transducer angle verification, transducer index point verification, longitudinal wave resolution and time base verification, and material ultrasonic velocity/delay verification. Each of the above calibrations are performed according to the ultrasonic transducer probe manufacturer's recommended instructions. However, the above described universal calibration apparatus 10 is substituted for the calibration block recommended by the manufacturer of the ultrasonic transducer probe.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A calibration apparatus for use with an ultrasonic transducer, said calibration apparatus comprising:

a first end, a second end, a first edge, a second edge, and a first surface;

a first portion comprising a first curved section, located at said first end, and a second curved section adjacent said first curved section, said first curved section having a thickness less than the thickness of said second curved section;

a second portion located adjacent to said first portion, said second portion comprising a flat elongate section comprising a plurality of calibration openings extending therethrough and a plurality of scribe lines located on said first surface; and a third portion located at said second end of said calibration apparatus, said third portion comprising a plurality of step sections and a plurality of notches, said notches extending from said first edge to said second edge, each said step section having a different thickness from said other step sections.

2. An apparatus in accordance with claim 1 wherein said first curved section of said first portion comprises a convex curved end surface.

3. An apparatus in accordance with claim 2 wherein said second curved section of said first portion comprises:

a first surface having a convex radius;

a second surface adjacent said first surface, said second surface having a concave radius; and a substantially straight third surface extending to said second edge, said third surface intersecting said second edge at a right angle.

4. An apparatus in accordance with claim 3 wherein said convex curved end surface of said first curved section of said first portion comprises a radius of about 2.0 inches, said first surface of said second curved section comprises a radius of about 1.0 inch, and said second surface of said second curved section comprises a radius of about 0.5 inch.

5. An apparatus in accordance with claim 1 wherein said second portion comprises ten calibration openings extending therethrough, said openings equally spaced apart from each other in a longitudinal direction and offset from said first edge in equal increasing increments.

6. An apparatus in accordance with claim 5 wherein said ten calibration openings are located about 0.75 inches apart from each other in a longitudinal direction and are offset from said first edge in increasing increments of about 0.1 inch with a first opening offset from said first edge about 0.1 inch and a tenth opening offset from said first edge about 1.0 inch.

7. An apparatus in accordance with claim 6 wherein said plurality of scribe lines comprises first, second and third scribe lines extending from said tenth calibration opening to said first edge, said first scribed line extending at an angle of about 45 degrees from a plane intersecting said tenth opening and perpendicular to a longitudinal axis of said elongate section, said second line extending at an angle of about 60 degrees from said perpendicular plane, and said third line extending at an angle of about 70 degrees from said perpendicular plane.

8. An apparatus in accordance with claim 7 wherein said plurality of scribe lines further comprises a fourth scribe line, said fourth scribe line extending perpendicular from said first edge such that said fourth line intersects said first edge at an apex of said radius of said first surface of said second curved section of said first portion.

9. An apparatus in accordance with claim 1 wherein said third portion of said elongate block comprises at least three notches extending from said first edge to said second edge.

10. An apparatus in accordance with claim 9 wherein the depth of a first notch is equal to about 80 percent of the thickness of said apparatus measured at the location of said first notch, and the depth of a second notch is equal to about 50 percent of the thickness of said apparatus measured at the location of said second notch, and the depth of a third notch is equal to about 20 percent of the thickness of said apparatus measured at the location of said third notch.

11. An apparatus in accordance with claim 1 wherein said plurality of step sections comprises a first step section comprising a thickness less than the thickness of said second portion of said calibration apparatus, and a second step section comprising a thickness less than the thickness of said first step section.

12. An apparatus in accordance with claim 1 wherein said calibration apparatus comprises a block of metal fabricated from aluminum, carbon steel, stainless steel, nickel-chromium alloy steel, copper, or brass.

13. An calibration apparatus for use with an ultrasonic transducer, said calibration apparatus comprising an elongate metal block, said elongate metal block comprising:
 a first end, a second end, a first edge, a second edge, and a first surface;
 a first portion comprising a first curved section, located at said first end, and a second curved section adjacent said first curved section, said first curved section having a thickness less than the thickness of said second curved section;
 a second portion located adjacent to said first portion, said second portion comprising a flat elongate section comprising a plurality of calibration openings extending therethrough and a plurality of scribe lines located on said first surface; and
 a third portion located at said second end of said elongate block, said third portion comprising a first step section, a second step section, and a plurality of notches, said notches extending from said first edge to said second edge, said first step section having a different thickness from said second step section.

14. An apparatus in accordance with claim 13 wherein said first curved section of said first portion comprises a convex curved end surface.

15. An apparatus in accordance with claim 14 wherein said second curved section of said first portion comprises:
 a first surface having a convex radius;
 a second surface adjacent said first surface, said second surface having a concave radius; and
 a substantially straight third surface extending to said second edge, said third surface intersecting said second edge at a right angle.

16. An apparatus in accordance with claim 15 wherein said convex curved end surface of said first curved section of said first portion comprises a radius of about 2.0 inches, said first surface of said second curved section comprises a radius of about 1.0 inch, and said second surface of said second curved section comprises a radius of about 0.5 inch.

17. An apparatus in accordance with claim 13 wherein said second portion comprises ten calibration openings extending therethrough, said openings equally spaced apart from each other in a longitudinal direction and offset from said first edge in equal increasing increments.

18. An apparatus in accordance with claim 17 wherein said ten calibration openings are located about 0.75 inches apart from each other in a longitudinal direction and are offset from said first edge in increasing increments of about 0.1 inch with a first opening offset from said first edge about 0.1 inch and a tenth opening offset from said first edge about 1.0 inch.

19. An apparatus in accordance with claim 18 wherein said plurality of scribe lines comprisies first, second and third scribe lines extending from said tenth calibration opening to said first edge, said first scribe line extending at an angle of about 45 degrees from a plane intersecting said tenth opening and perpendicular to a longitudinal axis of said elongate section, said second scribe line extending at an angle of about 60 degrees from said perpendicular plane, and said third scribe line extending at an angle of about 70 degrees from said perpendicular plane.

20. An apparatus in accordance with claim 19 wherein said plurality of scribe lines further comprises a fourth scribe line, said fourth scribe line extending perpendicular from said first edge such that said fourth scribe line intersects said first edge at an apex of said radius of said first surface of said second curved section of said first portion.

21. An apparatus in accordance with claim 13 wherein said plurality of notches comprises at least three notches extending from said first edge to said second edge.

22. An apparatus in accordance with claim 21 wherein the depth of a first notch is equal to about 80 percent of the thickness of said apparatus measured at the location of said first notch, and the depth of a second notch is equal to about 50 percent of the thickness of said apparatus measured at the location of said second notch, and the depth of a third notch is equal to about 20 percent of the thickness of said apparatus measured at the location of said third notch.

23. An apparatus in accordance with claim 13 wherein said first step section comprises a thickness less than the thickness of said second portion of said elongate block, and said second step section comprising a thickness less than the thickness of said first step section.

24. An apparatus in accordance with claim 13 wherein said elongate metal block comprises aluminum, carbon steel, stainless steel, nickel-chromium alloy steel, copper, or brass.

* * * * *